Jan. 1, 1963

C. S. R. DAIN ET AL 3,071,332

TAPE WINDING APPARATUS

Filed Nov. 23, 1959

Inventors
C. S. R. Dain
H. M. Harrison
By Glascock Downing Seebold
Attys.

3,071,332

TAPE WINDING APPARATUS

Charles Stanfield Rutherford Dain and Henry Milburn Harrison, Wells, Somerset, England, assignors to Electric & Musical Industries Limited, Middlesex, England, a company of Great Britain Filed Nov. 23, 1959, Ser. No. 854,671
Claims priority, application Great Britain Nov. 26, 1958
7 Claims. (Cl. 242—55.12)

Figure 1:
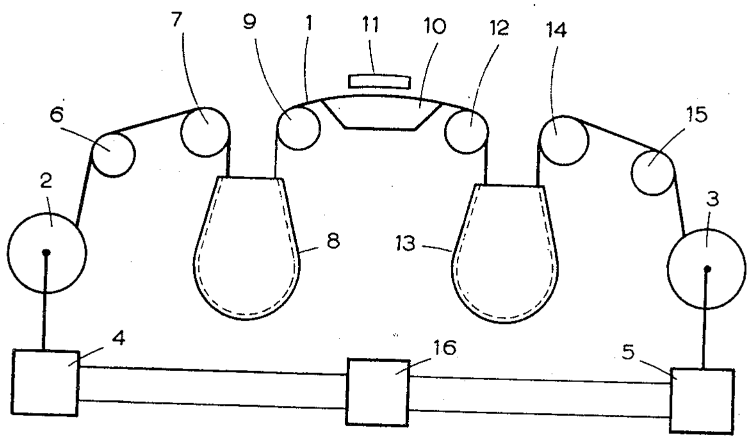

This invention relates to apparatus for winding web onto a spool and for unwinding web therefrom.

The invention has particular but not exclusive reference to apparatus in which the web is in the form of magnetisable tape and is arranged to be fed past a magnetic transducing head or heads, the apparatus being suitable for data storage purposes in so-called business machines.

The tape in such apparatus may be for example 1″ wide and may be required to be driven at a speed of 200″ per second in either direction. In one type of such apparatus a predetermined quantity of tape is maintained in a storage container or bin from which it is fed past the transducing head or heads and when the quantity of tape in the bin falls below a predetermined quantity more tape is fed to the bin from a spool and conversely when the tape in the bin exceeds a predetermined quantity tape is removed from the bin and wound on the spool. The tape may be fed from the spool to the bin by a vacuum capstan roller, the spool during the unwinding operation being driven by driving means such as an electric motor in the unwinding direction, and likewise when tape is required to be wound onto the spool from the bin the spool is rotated in the winding direction by said driving means, the direction of rotation of which has been reversed or by separate reverse driving means. During the unwinding operation of the spool when tape is being fed to the bin and during the winding operation of the spool when tape is being removed from the bin, the spool may be required to be driven at a speed of say 1,000 revolutions per minute, and it will be appreciated that both during the unwinding and winding operation it is desirable that a certain amount of tension be maintained in the tape between the capstan and the spool.

The object of the present invention is to provide an improved apparatus in which the required degree of tension can be readily obtained.

According to one feature of the invention there is provided apparatus for winding web onto a spool and for unwinding web therefrom comprising a vacuum capstan roller for feeding web from the spool to a position where it is substantially free from tension, means for driving the spool in either direction to unwind web therefrom or to wind web thereon, and means for applying suction to said capstan roller irrespective of the direction of rotation of the spool, the arrangement being such that slip occurs between the web and the capstan roller so that tension is imparted to the web between the spool and the capstan roller.

With such an arrangement, when the spool is rotated in a direction to unwind web the capstan roller is arranged to be driven in said direction so that its peripheral speed is greater than the maximum linear speed of the tape so that tension is maintained in the tape between the spool and the capstan roller. When the direction of rotation of the spool is reversed to wind tape thereon the capstan roller may continue to rotate, in a direction to feed web from the spool so that in this case also tension is maintained in the web between the capstan roller and the spool. If desired instead of rotating the capstan roller in the unwinding direction, when the spool is being driven in the winding direction, at the same speed as the capstan roller is driven during unwinding of web, the speed of the capstan roller may be reduced to zero. Preferably, however, during the period when the spool is rotated in the winding direction the capstan roller is rotated at a reduced speed of say 25 revolutions per minute in the unwinding direction. Since the web is urged into frictional engagement with the capstan roller in either case tension is still maintained in the web between the spool and the capstan roller.

According to another feature of the invention there is provided apparatus for winding web onto a spool and for unwinding web therefrom comprising a capstan roller for feeding web from the spool to a position where it is substantially free from tension, means for driving the spool in either direction to unwind web therefrom or to wind web thereon, means for urging said web into frictional engagement with said capstan roller irrespective of the direction of rotation of the spool, means for rotating the capstan roller at a speed greater than the maximum linear speed of the tape when the spool is rotated in an unwinding direction and means for rotating said capstan roller when the spool is rotated in a winding direction at a slower speed than that at which it is driven when the spool is rotated in an unwinding direction, the arrangement being such that slip occurs between the web and the capstan roller so that tension is imparted to the web between the spool and the capstan roller.

Although preferably said capstan roller is a vacuum capstan roller and suction is applied to said roller at all times irrespective of the direction of rotation of the spool, nevertheless other means may however alternatively be employed for effecting frictional engagement with said roller. For example the web may be urged into said frictional engagement by an air jet directed onto the surface of the web or a pressure pad may be employed resting on the surface of the web as it passes over the capstan roller.

It is to be understood that the term "spool" is to be interpreted in a wide sense as including any device on which web can be wound such as a simple shaft or the more conventional forms of spool having at least one radial-flange to confine the web.

Figure 2:
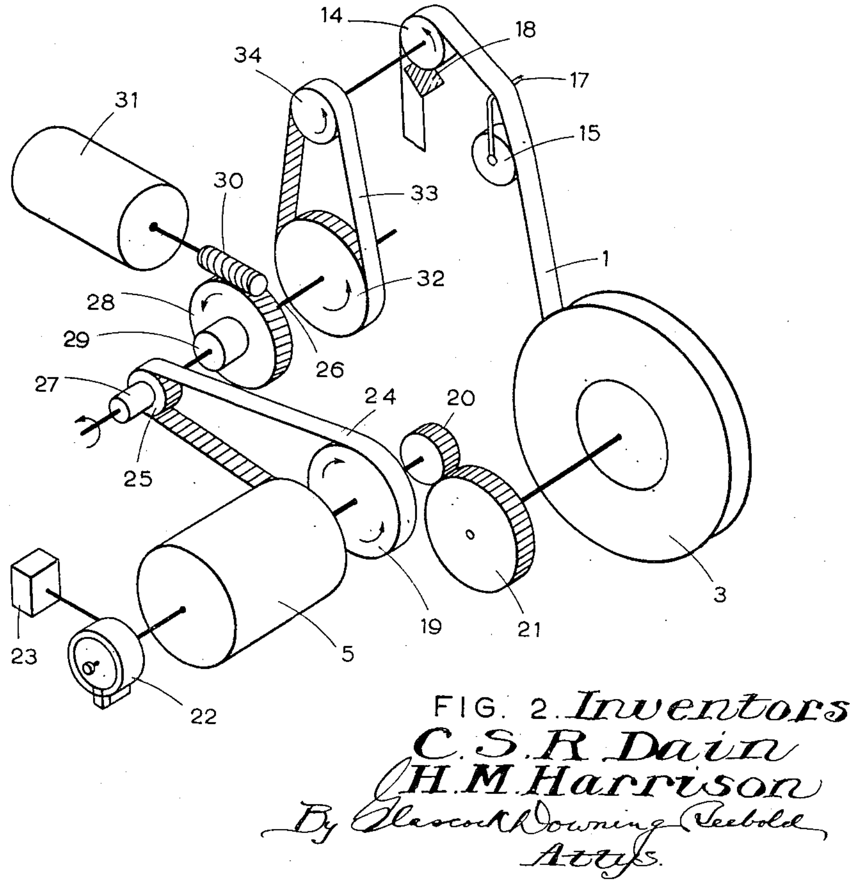

In order that the said invention may be clearly understood and readily carried into effect, it will now be more fully described with reference to the accompanying diagrammatic drawings, in which:

FIGURE 1 illustrates magnetic tape transducing apparatus to which the invention may be applied, and FIGURE 2 illustrates one embodiment of the invention.

The invention is particularly applicable to magnetic transducing apparatus such as magnetic data storage apparatus in which the web is in the form of magnetisable tape which may for example be 1″ wide, such tape as is well known usually comprising an insulating film made of a material such as a cellulose acetate, polyvinyl chloride or polyester resin having a coating of magnetic iron oxide. Such a tape may be required to be driven past magnetic transducing heads at a speed of about 200″ per second.

FIGURE 1 of the drawings illustrates diagrammatically magnetic transducing apparatus such as may be employed in magnetic data storage apparatus. In this figure the magnetisable tape is indicated at 1 and the ends thereof are wound upon spools 2 and 3 which can be driven in either direction by suitable driving means such as electric motors 4 and 5. Tape from the spool 2 passes over a guide roller 6, over a vacuum capstan roller 7 into a storage container or bin 8, where it is stored in a manner substantially free from tension, then over a further capstan roller 9 and over a supporting surface 10 where it moves in proximity to one or more transducing heads 11. The tape then passes over a further capstan roller 12 and into a further storage container or bin 13, then over a further vacuum capstan roller 14 and a further guide roller 15 and onto the spool 3. During operation of such apparatus it is required to maintain a predetermined quantity of tape in the bins 8 and 13. Thus when the tape 1 in one of the containers or bins 8 or 13 exceeds a predetermined quantity the tape is withdrawn from the container or bin and wound upon the associated spool, and when the tape in one of the containers reaches a predetermined minimum, tape from the associated spool is fed thereto to replenish the supply. The direction in which the tape is moved, that is to say either from right to left in FIGURE 1 or left to right, is determined by command signals which may be derived manually or from a computer, and in the embodiment shown in FIGURE 1 a source of command signals indicated at 16 is provided which as shown is coupled to the motors 4 and 5 so that the direction in which these motors rotate when energised is controlled in accordance with the direction in which the tape is required to be moved. Thus when the tape is required to be moved from left to right in FIGURE 1, then the motor 4, when energised, will rotate the spool 2 to unwind tape therefrom, and the motor 5 will when energised, rotate the spool 3 to wind tape thereon. Likewise when the tape is required to be driven from right to left the motors 4 and 5 when energised, will rotate the spools 2 and 3 respectively in the reverse directions. The rollers 7 and 14 are continuously rotated in directions so as to tend to feed tape into their associated containers 8 and 13 respectively. Motors coupled to the capstan rollers 9 and 12 are energised so as to rotate the rollers 9 and 12 continuously in opposite directions, and to drive the tape past the heads 11 in a required direction, one or other of the rollers 9 and 12 (which, in the present embodiment are vacuum capstan rollers) has suction applied thereto. If the tape is driven from left to right by the roller 12 then tape will be withdrawn from the container 8 and fed into the container 13 and when the quantity of tape in the container 8 falls below a predetermined minimum the motor 4 is energised so as to rotate the spool 2 in a direction to enable the capstan roller 7 to feed tape from the spool 2 into the container 8. Likewise when the tape in the container 13 exceeds a predetermined minimum the motor 5 will be energised so as to rotate the spool 3 in a direction to wind tape thereon and remove it from the container 13. The reverse operations occur when the tape is being driven from right to left by the roller 9. The energisation of the motors 4 and 5 is determined in accordance with the measured quantity of the tape in the bins 8 and 13, the quantity of tape therein being determined in any suitable manner.

During operation of the apparatus shown in FIGURE 1, it is desired that the tape between the spool 2 and the capstan roller 7, and between the spool 3 and the capstan roller 14 be under a certain amount of tension irrespective of the directions of rotation of the spools 2 and 3 and, preferably, irrespective of whether the spools 2 and 3 are rotating or stationary. For this purpose the rollers 7 and 14 have suction applied thereto continuously and these rollers together with their associated spools are arranged to be driven by the mechanism shown in FIGURE 2. FIGURE 2 illustrates a mechanism suitable for use in conjunction with the spool 3 and the capstan roller 14 and it will be appreciated that a similar mechanism will be associated with the spool 2 and the capstan roller 7.

FIGURE 2 shows the tape 1 passing from the spool 3 over the guide roller 15 the shaft of which carries a tension sensing arm 17 which serves to de-energise the apparatus should the tape break or should the supply of tape on the spool 3 be exhausted, or the vacuum fail during operation. The tape may be stripped from the capstan roller 14 by a plate 18 which may be formed by a lip of the bin 13. As aforesaid the spool 3 is arranged to be rotated in either direction, and for this purpose the spool 3 is driven by means of the reversible electric motor 5 which as shown in FIGURE 2 drives a pulley 19 and a gear wheel 20 which meshes with a further gear wheel 21 carried by a shaft on which the spool 3 is supported. The gears 20 and 21 may be reduction gears so that the spool 3 is driven at the required speed from the motor 5 which latter may rotate at about 1,500 revolutions per minute. The motor 5 is provided with any suitable form of brake 22 which may be actuated by a solenoid 23 at appropriate times. Preferably the solenoid 23 is connected in the energising circuit of the motor 5 in such a manner that whenever the motor 5 is de-energised the brake 10 is applied and vice versa. The pulley 19 is coupled via a belt or other suitable form of drive 24 to a pulley 25 mounted on a lay shaft 26, the pulley 25 being associated with a free wheel or unidirectional clutch 27. The pulley 25 is coupled via the lay shaft to a worm wheel 28 through a free wheel or unidirectional clutch 29, the worm wheel 28 meshing with a worm 30 driven by an electric motor 31. The lay shaft 26 also carries a pulley 32 coupled by a belt or other suitable drive 33 to a pulley 34 mounted on a shaft carrying the capstan roller 14. The clutches or free wheel devices 27 and 29 are arranged to impart a positive drive in the same direction, i.e. in the present embodiment in an anticlockwise direction, and to free wheel in the opposite direction.

Assuming that the spool 3 is stationary, the motor 31 is energised to drive the capstan 14 through the worm wheel 28 and worm 30 and pulleys 32 and 34 at a comparatively slow speed of, for example, 25 revolutions per minute in the direction of the arrows. No drive from the motor 31 is transmitted to the spool 3 owing to the provision of the free wheel devices 27 and 29. Assuming that the spool 3 is required to feed tape to the bin 13, the motor 5 is energised so as to rotate the spool 3 in a clockwise direction and simultaneously the drive from the motor 5 is transmitted to the lay shaft 26 so as to drive the latter via the free wheel device 27 as a result of which the speed of the capstan roller 14 is increased to a much higher speed of say 4,500 revolutions per minute and during such high speed rotation of the roller 14, the free wheel device 29 is over driven. The peripheral speed of the capstan roller 14 to which as aforesaid suction is continuously applied is arranged to be greater than the maximum linear speed of the tape 1 as it is being unwound by the driving of the spool 3 with the result that slip occurs between the capstan roller 14 and the tape 1 so that the tape between the spool 3 and the capstan roller 14 is maintained in a state of tension. When it is desired to wind tape onto the spool 3 the direction of rotation of the motor 5 is reversed to rotate the spool 3 in the winding direction, i.e. anticlockwise as viewed in FIGURE 2, and since the belt 24 is also reversed in its direction of movement rotation of the motor imparts no movement to the lay shaft 26 since the clutch or free wheel device 27 then free wheels. However, during this operation the motor 31 rotates the lay shaft 26 through the medium of the worm 30 and the worm wheel 28 so as to drive the capstan roller 14 in the direction of the arrow at the aforesaid slow speed. Thus during winding tape onto the spool 3 tension is also maintained in the tape between the capstan roller 14 and the spool 3 due to the slip which occurs between the tape 1 and the roller 14. When the spool 3 is stationary the roller 14 is rotating in the direction of the arrow at the aforesaid comparatively slow speed so that in this case also slip occurs and the tape between the spool 3 and the roller 14 is under tension.

If desired, the motor 31, worm 30, worm wheel 28 and free wheel device 29 can be omitted so that during the winding operation no drive is transmitted to the capstan roller 14 and the latter is arranged to be held stationary during winding of the tape onto the spool 3 although vacuum is still applied to the roller 14 so as to maintain a desired degree of tension in the tape between the spool 3 and the capstan roller 14 as the tape 1 slips relatively to the stationary roller 14.

What we claim is:

1. Apparatus for winding web onto a spool from a position where said web is substantially free from tension comprising means for feeding web to said position, a capstan roller engageable with said web between said position and said spool, means for driving said spool intermittently in winding direction to maintain within predetermined limits the amount of web in said position, means for urging said web into engagement with said capstan roller whenever said roller is rotating whilst allowing slip to take place between said web and said roller, and control means for causing continuous rotation of said capstan roller whenever the apparatus is operational and in the sense tending to draw said web from said spool so that slip takes place between said web and said roller, so that tension is imparted to the web extending between said spool and said capstan roller even when said spool is stationary.

2. Apparatus for winding web onto a spool from a position where said web is substantially free from tension comprising means for feeding web to said position, a vacuum capstan roller engageable with said web between said position and said spool, means for driving said spool intermittently in winding direction to maintain within predetermined limits the amount of web in said position, means for applying suction to said capstan roller to draw said web into engagement therewith whenever said roller is rotating whilst allowing slip to take place between said web and said roller, and control means for causing continuous rotation of said capstan roller whenever the apparatus is operational and in the sense tending to draw said web from said spool so that slip takes place between said web and said roller, so that tension is imparted to the web extending between said spool and said capstan roller even when said spool is stationary.

3. Apparatus according to claim 1 in which the control means for causing continuous rotation of the capstan roller comprises a driving motor individual to the capstan roller for causing said capstan roller to be rotated at a relatively slow speed compared with the speed of the spool when said spool is rotating.

4. Magnetic tape transducing apparatus comprising a supply spool for magnetic tape; a take-up spool for magnetic tape; guide means for guiding the magnetic tape from said supply spool to said take-up spool; magnetic transducing means disposed to co-operate with magnetic tape guided by said guide means; a first storage container for containing slack tape in the path of the tape from said supply spool to said transducing means; a second storage container for containing slack tape in the path of the tape from said transducing means to said take-up spool; said guide means including capstan means for moving tape intermittently from said first storage container to said second storage container when it is desired to render the transducing means operative on said tape; means for driving said supply spool intermittently in an unwinding direction to maintain an amount of slack tape in said first container; means for driving said take-up spool in the winding direction to remove excess slack tape from said second storage container; said guide means further including a tensioning capstan engageable with the tape between the supply spool and said first storage container and including means for urging the tape into engagement with said tensioning capstan when said capstan is rotating whilst allowing slip to take place between the capstan and said tape means for causing continuous rotation of said tensioning capstan in a sense tending to draw said tape from said supply spool whenever the transducing apparatus is operational, so that the tape is tensioned even when the supply spool is stationary; said guide means further including a second tensioning capstan engageable with the tape between said second storage container and the take-up spool and including means for urging the tape into engagement with said second tensioning capstan when said capstan is rotating whilst allowing slip to take place between the tape and the tensioning capstan; and control means for causing continuous rotation of said second tensioning capstan in a sense tending to draw tape from said take-up spool whenever the transducing apparatus is operational so that tension is imparted to the tape even when the take-up spool is stationary.

5. Apparatus for unwinding web from a spool to a position where said web is substantially free from tension comprising means for removing web from said position, a capstan roller engageable with said web between said position and said spool, means for driving said spool intermittently in unwinding direction to maintain within predetermined limits the amount of web in said position, means for urging said web into engagement with said capstan roller, whenever said roller is rotating while allowing slip to take place between said web and said roller, and control means comprising first means for driving said capstan roller in unwinding direction whenever said spool driving means is operational to rotate said spool in an unwinding direction, said first means being operative to drive said capstan roller at a first speed such as to tend to draw web from said spool at a higher speed than that at which the web is unwound from said spool so that slip takes place between said web and said roller and tension is imparted to the tape, said control means further comprising auxiliary drive means for driving said capstan roller in the unwinding direction when said spool is stationary at a speed less than said first speed to maintain tension in said tape even when the spool is stationary.

6. Apparatus according to claim 5, wherein said first means for driving said capstan roller in unwinding direction includes a unidirectional coupling from said spool driving means to said capstan roller which is operable to transmit the drive from said spool driving means to said capstan roller only when said spool is rotated in an unwinding direction.

7. Apparatus for unwinding web from a spool to a position where said web is substantially free from tension comprising means for removing web from said position, a vacuum capstan roller engageable with said web between said position and said spool, means for driving said spool intermittently in unwinding direction to maintain within predetermined limits the amount of web in said position, means for applying suction to said capstan roller to draw said web into engagement therewith, whenever said roller is rotating while allowing slip to take place between said web and said roller, and control means comprising first means for driving said capstan roller in unwinding direction whenever said spool driving means is operational to rotate said spool in an unwinding direction, said first means being operative to drive said capstan roller at a first speed such as to tend to draw web from said spool at a higher speed than that at which the web is unwound from said spool so that slip takes place between said web and said roller and tension is imparted to the tape, said control means further comprising auxiliary drive means for driving said capstan roller in the unwinding direction when said spool is stationary at a speed less than said first speed to maintain tension in said tape even when the spool is stationary.

References Cited in the file of this patent

UNITED STATES PATENTS

| | | |
|---|---|---|
| 1,949,237 | Bradner | Feb. 27, 1934 |
| 2,778,634 | Gams et al. | Jan. 22, 1957 |
| 2,838,250 | Stavrakis et al. | June 10, 1958 |
| 2,951,652 | Rezek et al. | Sept. 6, 1960 |